(12) United States Patent
Tiberghien et al.

(10) Patent No.: US 10,816,122 B2
(45) Date of Patent: Oct. 27, 2020

(54) FLUIDIC COUPLING

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Serafim Marques Barroca, Frontenex (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 57 days.

(21) Appl. No.: 16/364,429

(22) Filed: Mar. 26, 2019

(65) Prior Publication Data
US 2019/0301651 A1 Oct. 3, 2019

(30) Foreign Application Priority Data

Apr. 3, 2018 (FR) ...................... 18 52878

(51) Int. Cl.
*F16L 37/30* (2006.01)
*F16K 3/24* (2006.01)
(Continued)

(52) U.S. Cl.
CPC .............. *F16L 37/30* (2013.01); *F16K 3/246* (2013.01); *F16K 31/5286* (2013.01); *F16L 37/32* (2013.01); *F16L 37/34* (2013.01)

(58) Field of Classification Search
CPC . F16L 37/30; F16L 37/32; F16L 37/34; F16L 29/02; F16L 29/04; F16K 31/5286;
(Continued)

(56) References Cited

U.S. PATENT DOCUMENTS 3,790,126 A 2/1974 Ostand
8,056,581 B2 * 11/2011 Danielson ............... F16L 37/44
137/614.02
2013/0206261 A1 8/2013 Prust

FOREIGN PATENT DOCUMENTS

DE 102010019094 A1 11/2011
EP 2020555 A1 2/2009
WO 98/16773 A1 4/1998

OTHER PUBLICATIONS

International Search Report for FR1852878, dated Nov. 14, 2018, 2 Pages.

* cited by examiner

*Primary Examiner* — Michael R. Reid

(57) ABSTRACT

This fluidic coupling (R) comprises a male element (A) comprising a male body (2), a valve (20) and a spring (24) pushing the valve (20) back toward its closed position, and a female element (B) having a sealing gasket (35), a piston (38), a slide valve (34) mounted around the piston (38) between a closed position, in which the sealing gasket (35) cooperates with the slide valve (34) and the slide valve (34) cooperates sealably with the piston (38), and a retracted open position. In a coupling phase, the male body (2) pushes the slide valve (34) back toward its open position and the piston (38) pushes the valve (20) back toward its open position. The piston (38) is mounted with the possibility of movement between a rear position and a forward position. The female element (B) comprises a lever (42) for converting the movement of the slide valve (34) into movement of the piston (38). During the coupling, from the closed position of the slide valve (34) to an offset position of the slide valve (34), in which the male body (2) cooperates with the sealing gasket (35) of the female body (26), the lever (42) is disengaged from the slide valve (34) and/or the piston (38), (Continued)

and the piston (38) is in the rear position. From the offset position of the slide valve (34) to the open position of the slide valve (34), the lever (42) is engaged with the slide valve (34) and with the piston (38), and moves the piston (38) toward its forward position. In the coupled configuration, the piston (38) is in its forward position and extends partially in the male body (2), a fluid passage being formed around the piston (38).

15 Claims, 13 Drawing Sheets

(51) Int. Cl.
    *F16K 31/528*     (2006.01)
    *F16L 37/32*     (2006.01)
    *F16L 37/34*     (2006.01)

(58) Field of Classification Search
    CPC ............. F16K 31/54; Y10T 137/87941; Y10T 137/87949; Y10T 137/87957
    USPC ........................................ 137/614.02–614.04
    See application file for complete search history.

FLUIDIC COUPLING

The present invention relates to a fluidic coupling.

For the coupling of plates bearing complementary male and female coupling elements, it is known in particular from EP 2,020,555 to use couplings whereof the male element includes a nose and a valve, and the female element includes a fixed central piston pushing back the valve of the male element and a slide valve surrounding the piston and able to be pushed back by the nose of the male element. This allows the adaptation to potential alignment flaws between the two coupling elements at the beginning of the coupling.

However, certain applications, such as flanging parts, require a short male nose element (distance between the plate and the front face of the nose that is as short as possible) and very small coupling travels (of around no more than 5 mm) that are not compatible with the fixed piston/slide valve construction described in EP 2,020,555. Indeed, with a small coupling travel, in the coupled configuration, the fluid passage around the piston in the male body is insufficient.

It is also known from U.S. Pat. No. 3,790,126 to actuate a piston to open the passage between two pipes using an external lever. In the coupling sequence, the operator brings the male and female bodies closer together to acquire sealing between the male body and the female body. Then the operator actuates the lever and moves the piston forward to open the passage (this construction does not comprise a slide valve movable around the piston). In this coupling sequence, the opening is not done during the approach of the male and female bodies and is therefore not automatic.

The invention aims to resolve these drawbacks by proposing a new fluidic coupling allowing an automatic opening of the fluid passage that is better adapted to small coupling travels.

To that end, the invention relates to a fluidic coupling comprising a male coupling element and a female coupling element able to fit in one another, the male element comprising:

a male body defining an inner conduit, a valve, movable relative to the male body between an open position and a sealed closed position of the inner conduit of the male body, a spring pushing the valve back toward its closed position, and the female coupling element comprising:

a female body defining an inner conduit along a longitudinal central axis and including at least one sealing gasket, a piston extending along the longitudinal central axis, a slide valve mounted around the piston and movable relative to the female body along the longitudinal central axis between a closed position, in which the sealing gasket of the female body cooperates with the slide valve and the slide valve cooperates sealably with the piston, and a retracted open position of the inner conduit of the female body, in a coupling phase between the male element and the female element, the male body pushes the slide valve back toward its open position and the piston pushes the valve back toward its open position.

Said fluidic coupling is characterized in that:

the piston is mounted with the possibility of movement relative to the female body along the longitudinal central axis between a rear position and a forward position, the female element comprises at least one lever for converting the movement of the slide valve into movement of the piston, during the coupling phase:

from the closed position of the slide valve to an offset position of the slide valve, in which the male body cooperates with the sealing gasket of the female body, the or each lever is disengaged from the slide valve and/or the piston, and the piston is in the rear position;

from the offset position of the slide valve to the open position of the slide valve, the lever is engaged with the slide valve and with the piston, and moves the piston toward its forward position, and in the coupled configuration, the piston is in its forward position and extends partially in the male body, a fluid passage being formed around the piston in the male body.

Owing to the invention, the forward movement of the piston in the female body, obtained automatically during the coupling and after a free travel of the slide valve ring allowing the sealed engagement of the male body with the female body before the loss of sealing of the piston with the slide valve, offers a satisfactory passage of fluid in a small coupling travel configuration.

According to advantageous but optional aspects of the invention, such a fluidic coupling may incorporate one or more of the following features, considered in any technically allowable combination:

The lever is mounted rotatably around a fixed rotation axis relative to the female body.

The lever cooperates with the piston by a pin moving in a hole, and the lever is engaged with the piston by cooperation of the pin with an active surface of the hole.

Between the closed position and the offset position of the slide valve, the lever is disengaged from the piston and the pin is in motion in the hole along a curved surface of the hole, centered on the rotation axis of the lever.

The slide valve cooperates with the lever by a slide valve axle moving in a cavity, and the lever is engaged with the slide valve by cooperation of the slide valve axle with an active surface of the cavity.

Between the closed position and the offset position of the slide valve, the lever is detached from the slide valve and the slide valve cooperates with the lever by a slide valve axle moving in a cavity comprising a longitudinal sliding portion in which the slide valve axle moves when the lever is detached from the slide valve, and an active surface inclined relative to the sliding portion, with which the slide valve axle cooperates when the lever is engaged with the slide valve.

The ratio between an axial movement travel of the piston between its rear position and its forward position and an axial movement travel of the slide valve between its offset position and its open position in the coupled configuration is at least equal to 1.2, preferably at least equal to 2.25.

The piston extends along the longitudinal central axis, and the female element comprises two levers positioned on either side of the longitudinal central axis, each of the levers cooperating with the piston by a pin moving in a hole of the piston, each of the levers cooperating with the slide valve by a slide valve axle moving in a cavity of the slide valve, and each of the levers comprising a fixed axle pivoting in a housing secured to the female body along the longitudinal central axis.

For each lever, in a configuration engaged with the piston and with the slide valve, the ratio between the distance between the fixed rotation axis and a central axis of the pin and the distance between the fixed rotation axis and a central axis of the slide valve axle is strictly greater than 1.2, preferably greater than or equal to 2.

The slide valve is formed by a ring delimiting an inner volume in which the lever(s) and the piston are mounted.

The piston comprises a rear centering rod, and in all the positions of the piston in its movement relative to the female body, the rear rod is engaged in a guide housing secured to the female body.

The fluidic coupling comprises a yoke ring mounted secured to the female body along the longitudinal central axis, and the yoke ring comprises at least one flange that extends along the longitudinal central axis and that cooperates laterally with the piston and the lever.

The yoke ring forms a stop behind the piston in its rear position.

The or each lever has a triangular outer shape.

The male body comprises a nose mounted with the possibility of movement, transversely to the longitudinal central axis, relative to another portion of the male body.

The invention will be better understood and other advantages thereof will appear more clearly in light of the following description of a fluidic coupling according to its principle, provided as a non-limiting example in reference to the appended drawings, in which.

Figure 1:
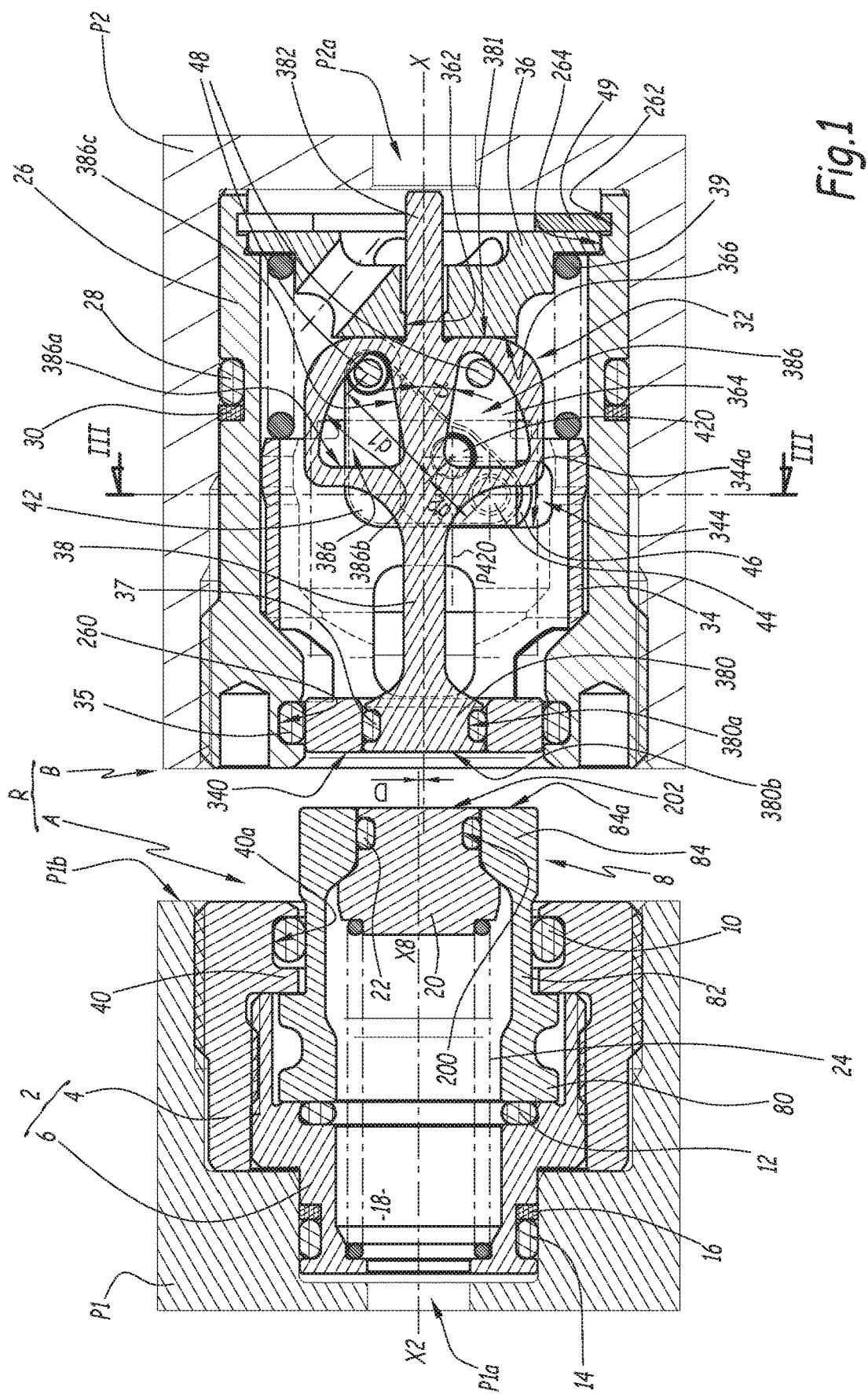
FIG. 1 is a longitudinal sectional view of a coupling according to the invention, in an uncoupled configuration.
Figure 2:
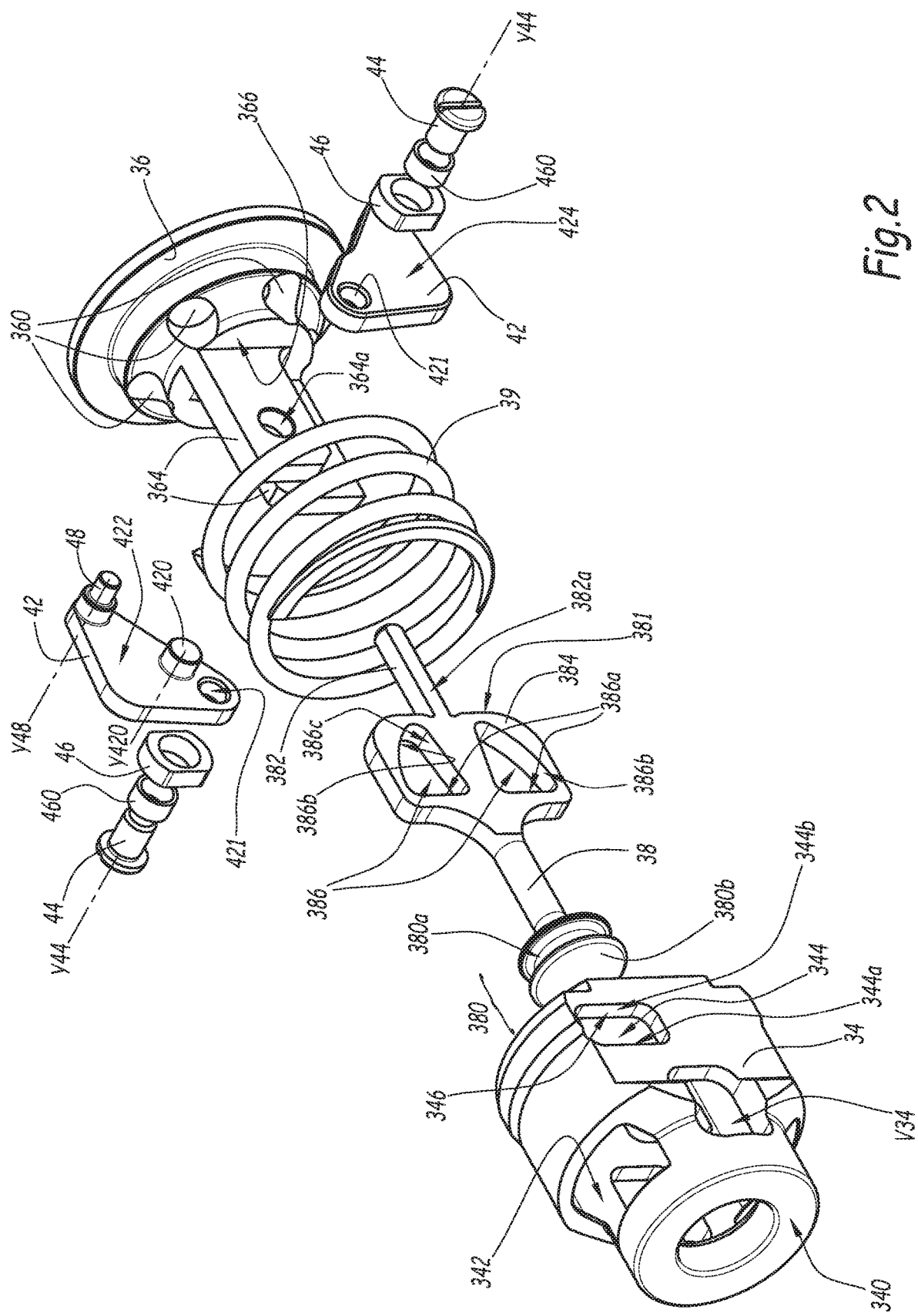
FIG. 2 is an exploded perspective view of a portion of the coupling of FIG. 1.
Figure 3:
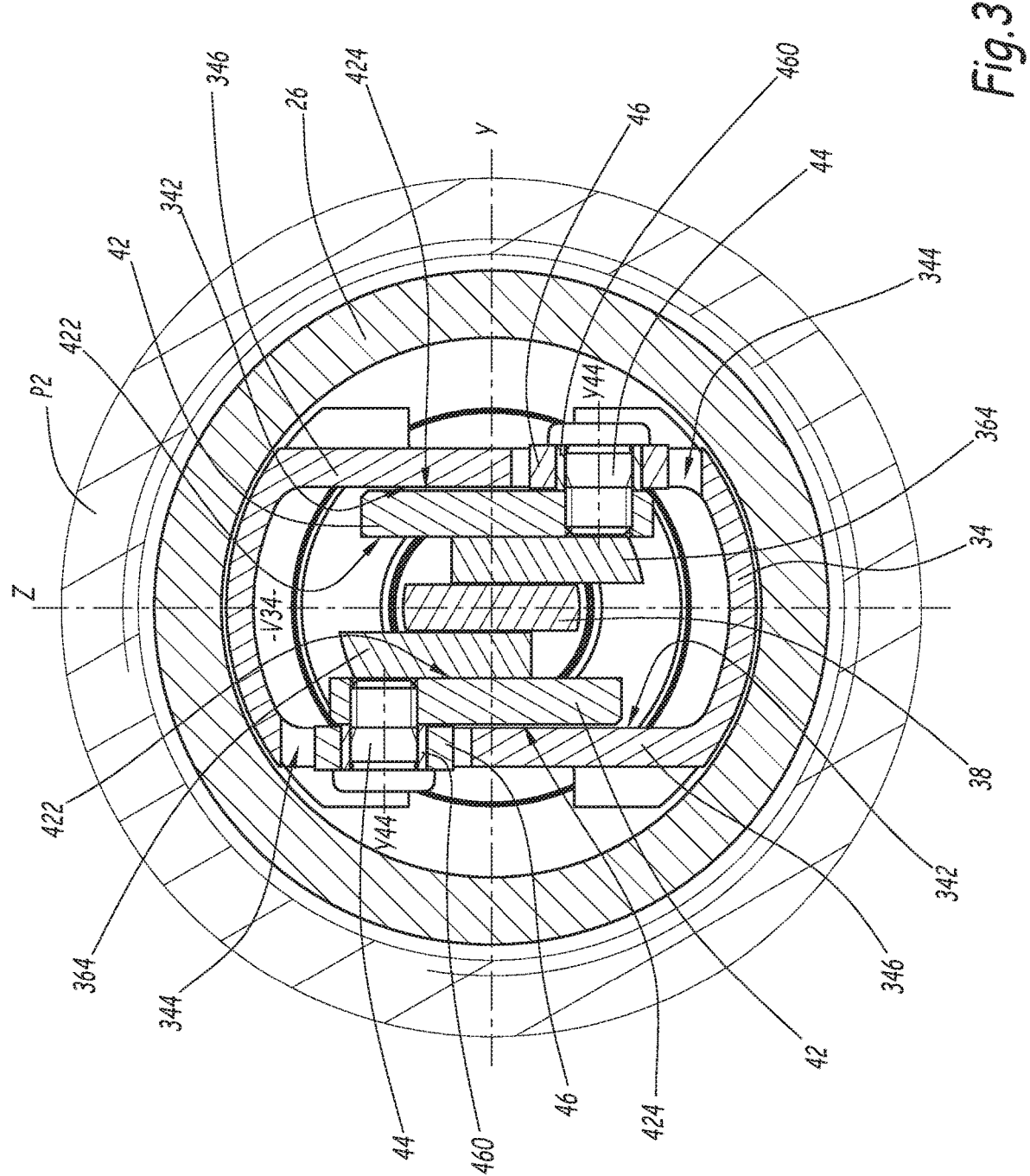
Figure 4:
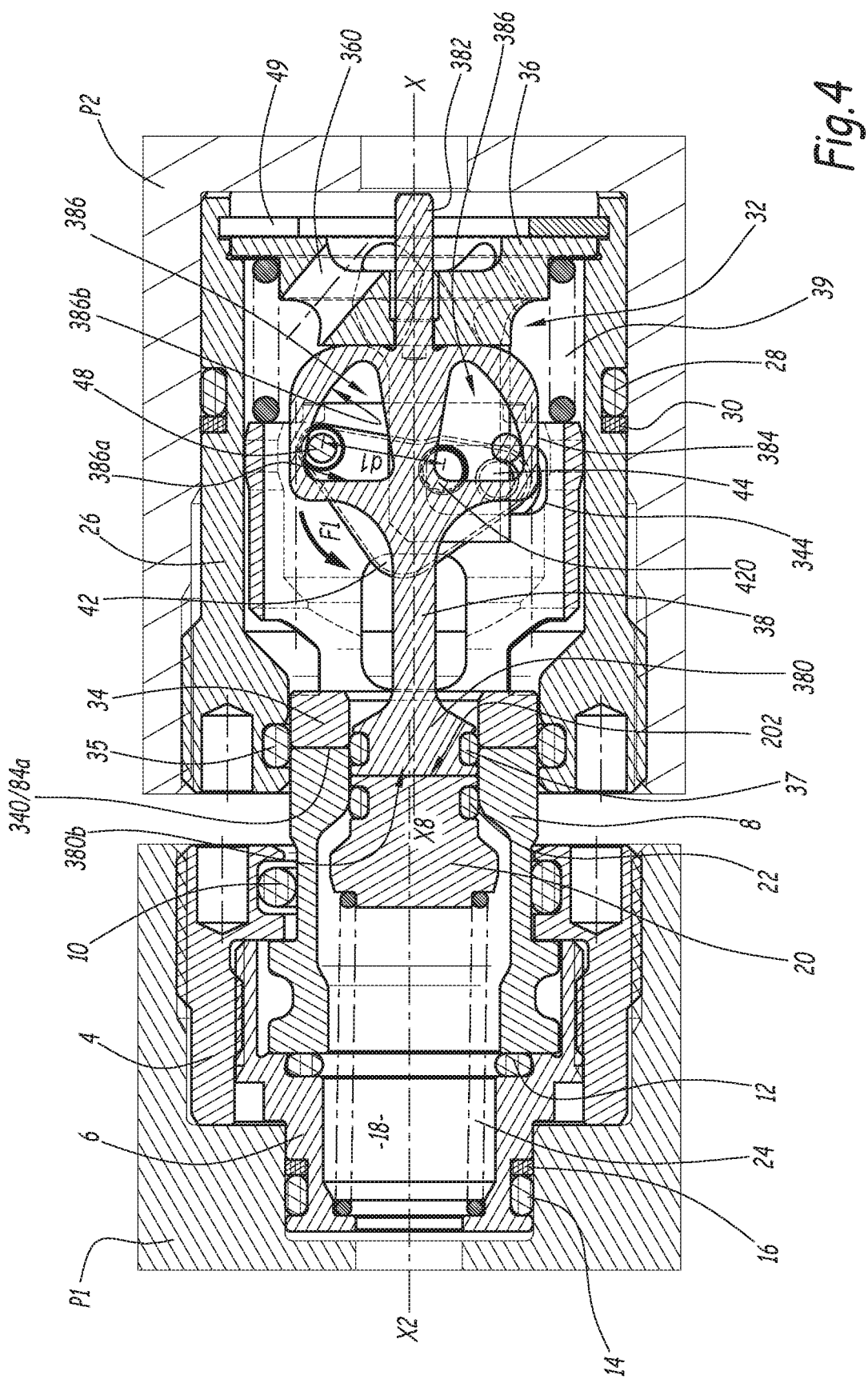
Figure 5:
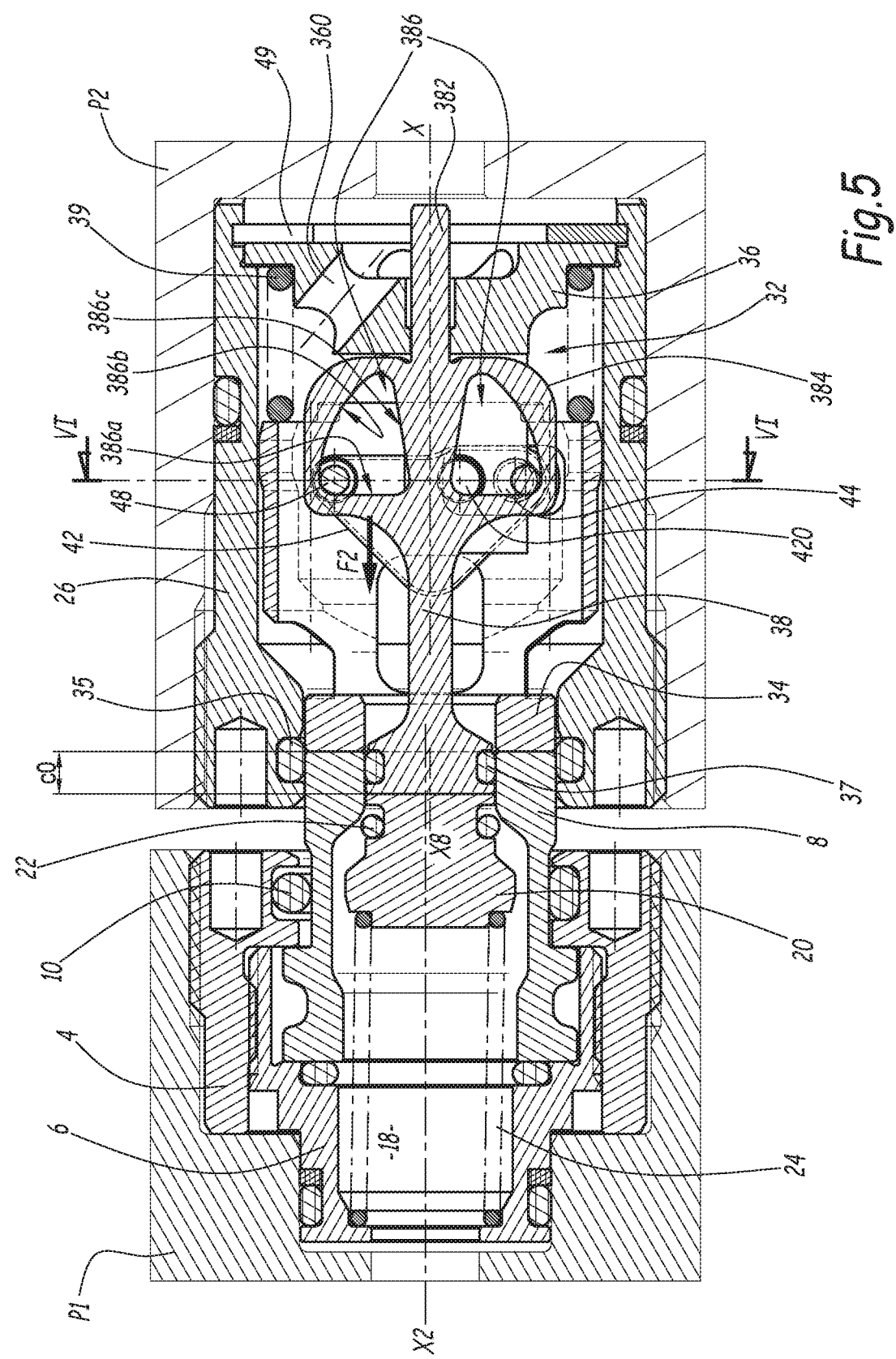
Figure 6:
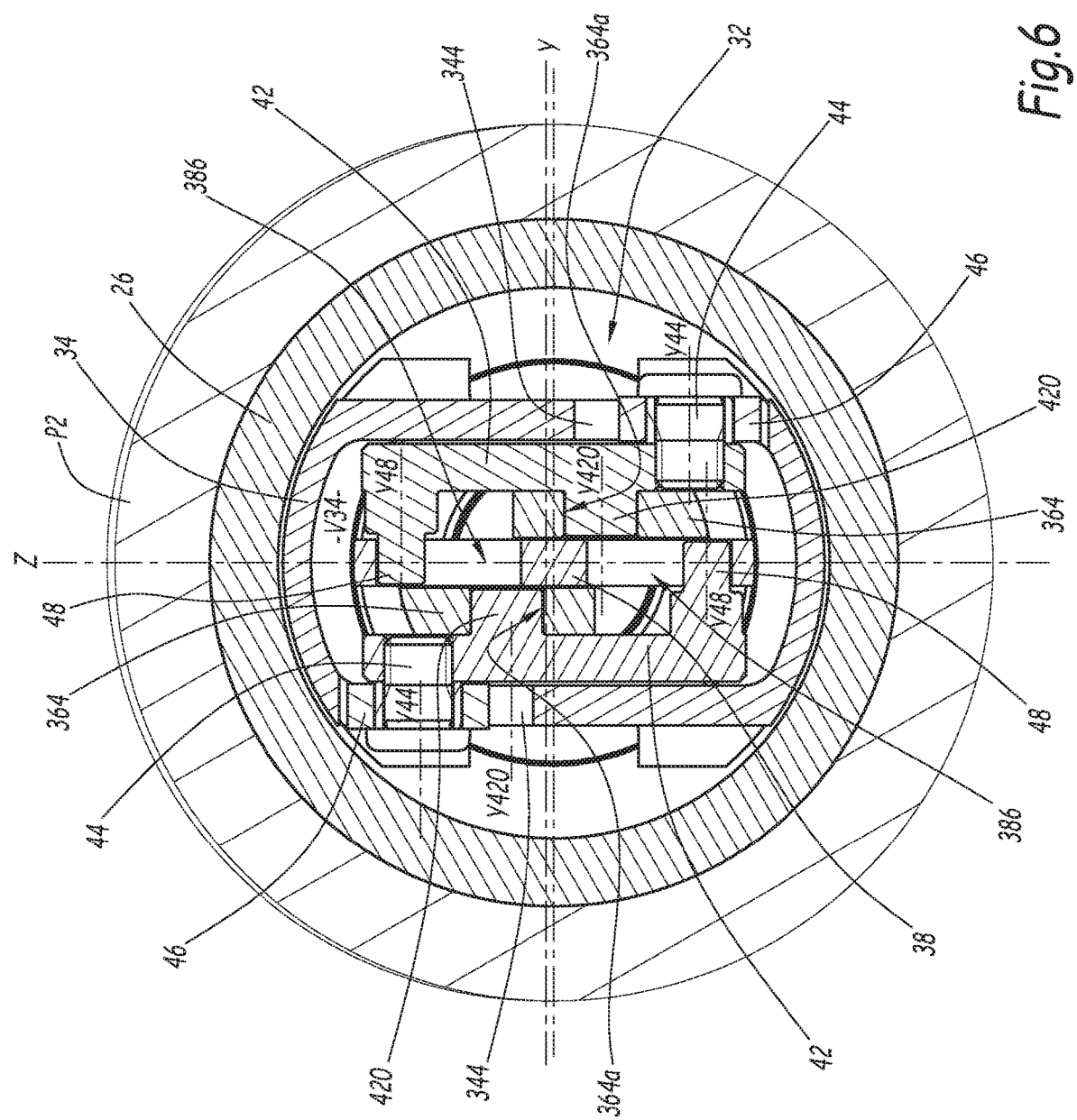
Figure 7:
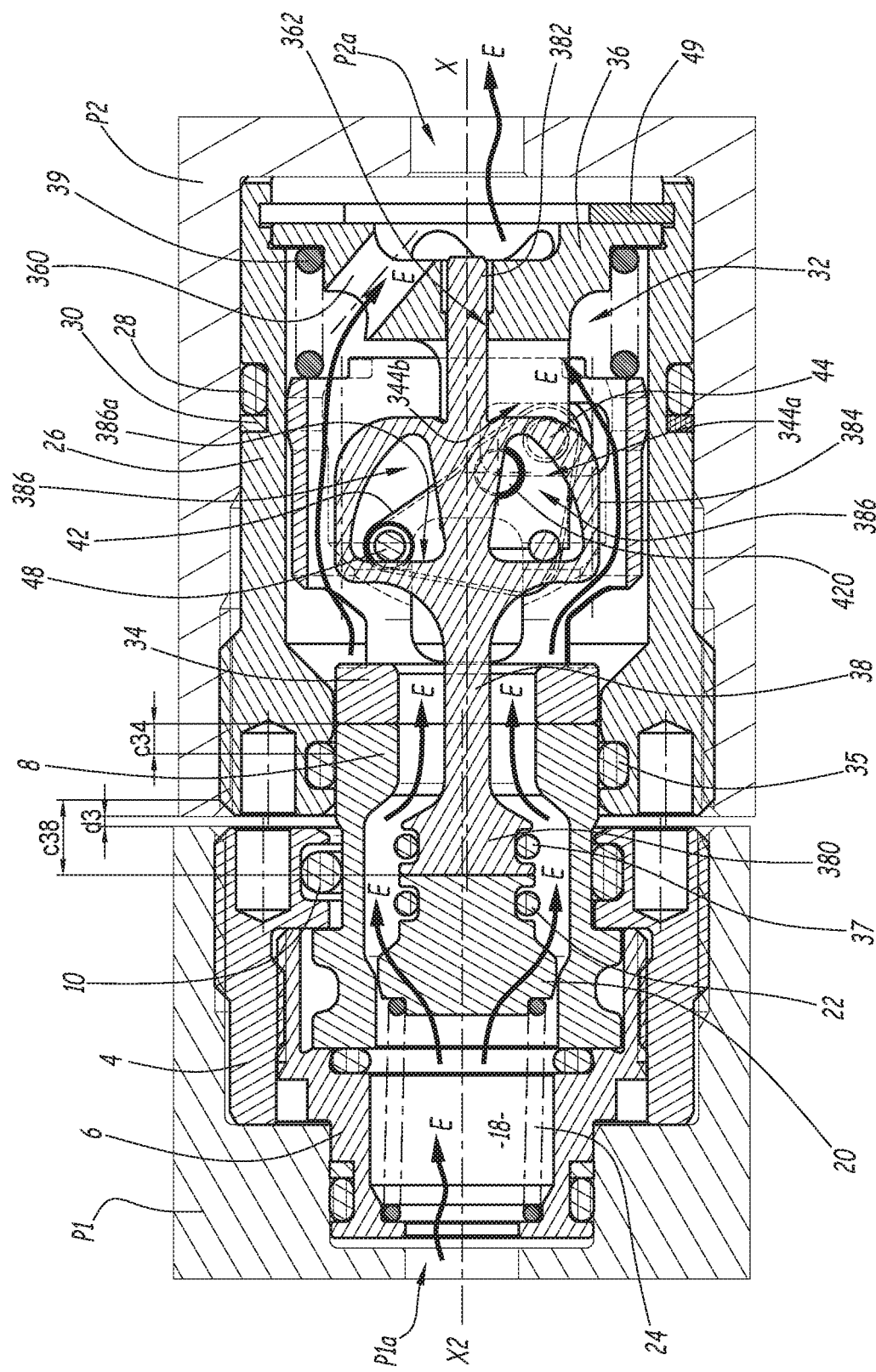
Figure 8:
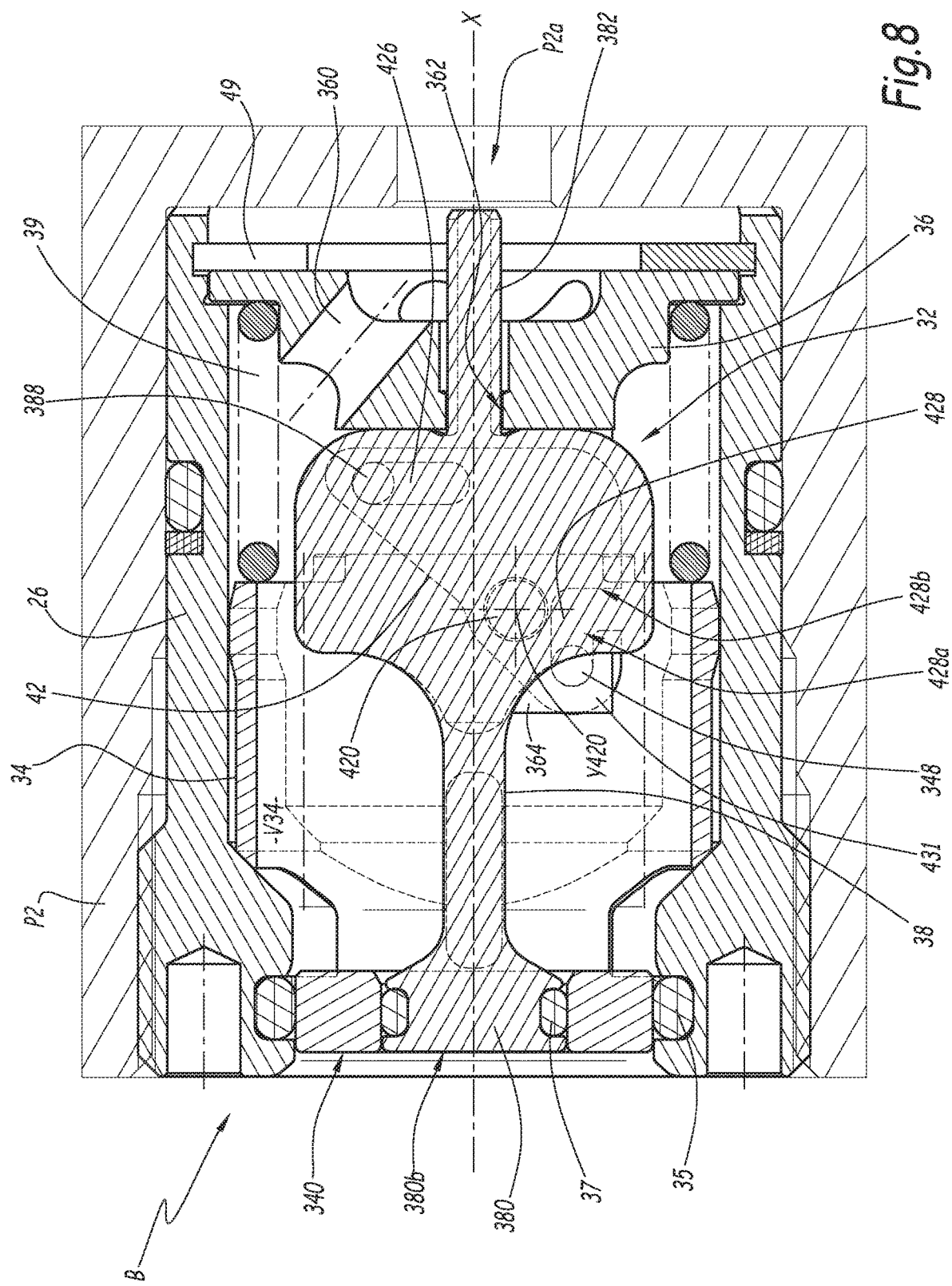
Figure 9:
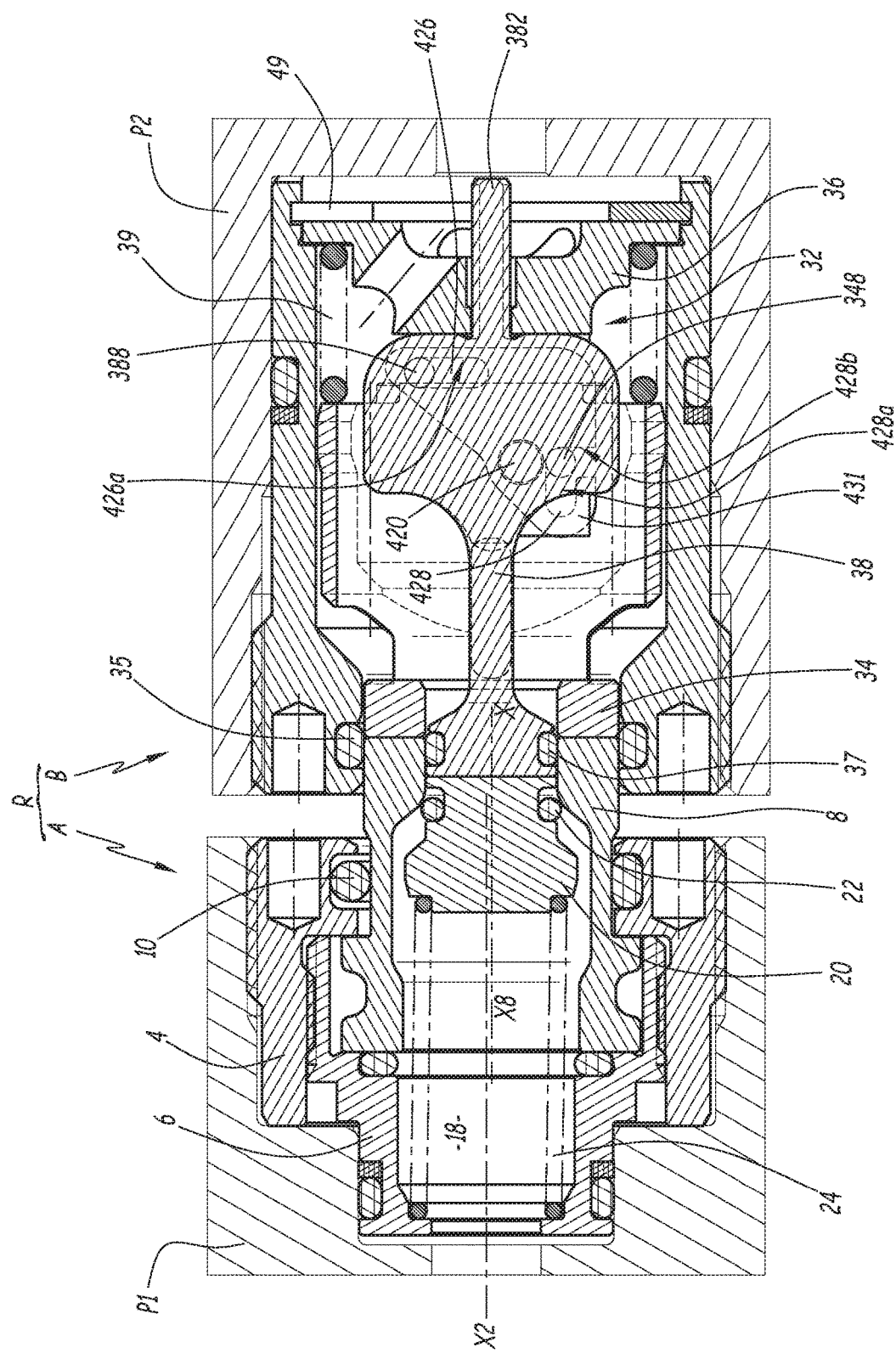
Figure 10:
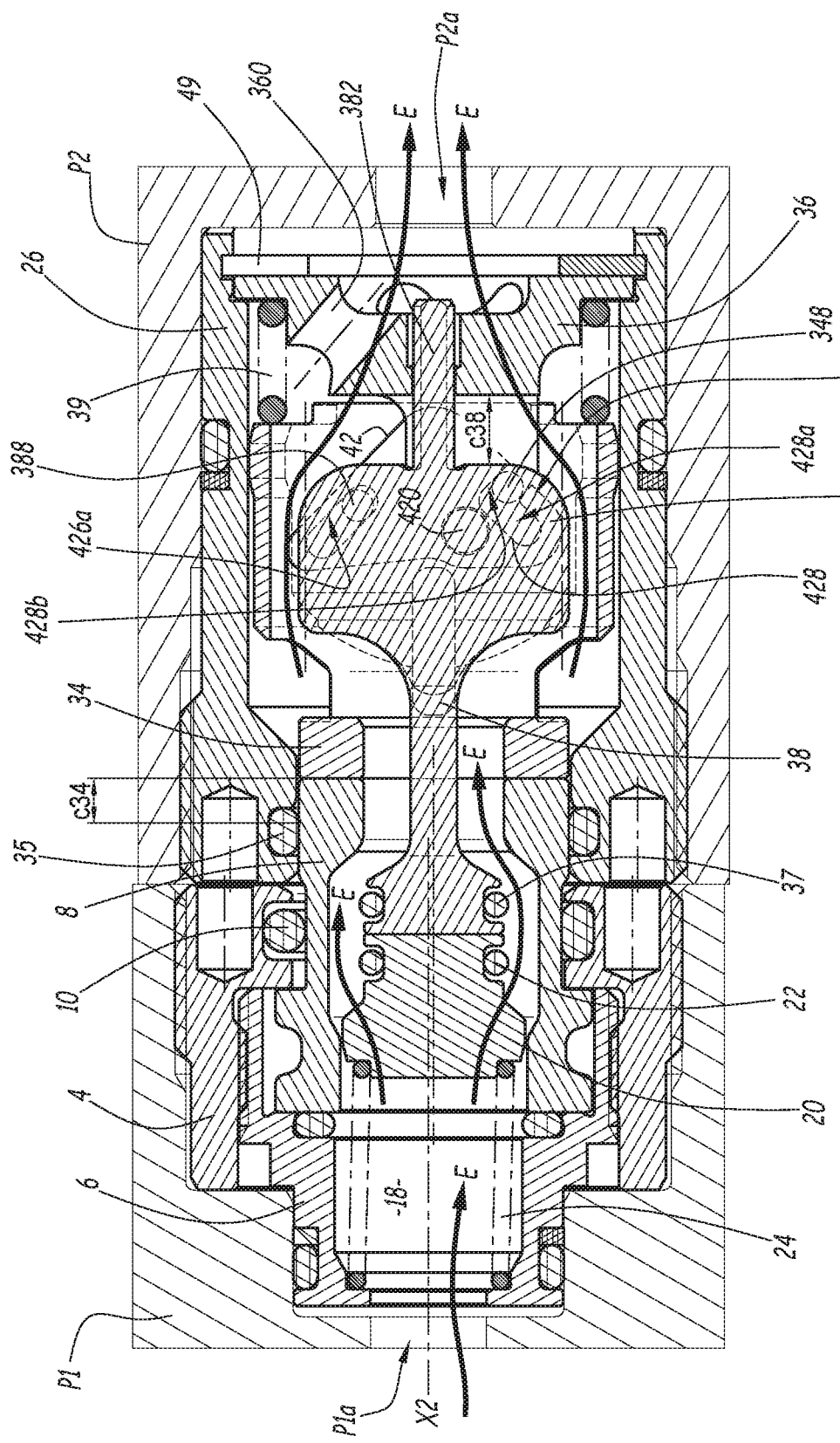
Figure 11:
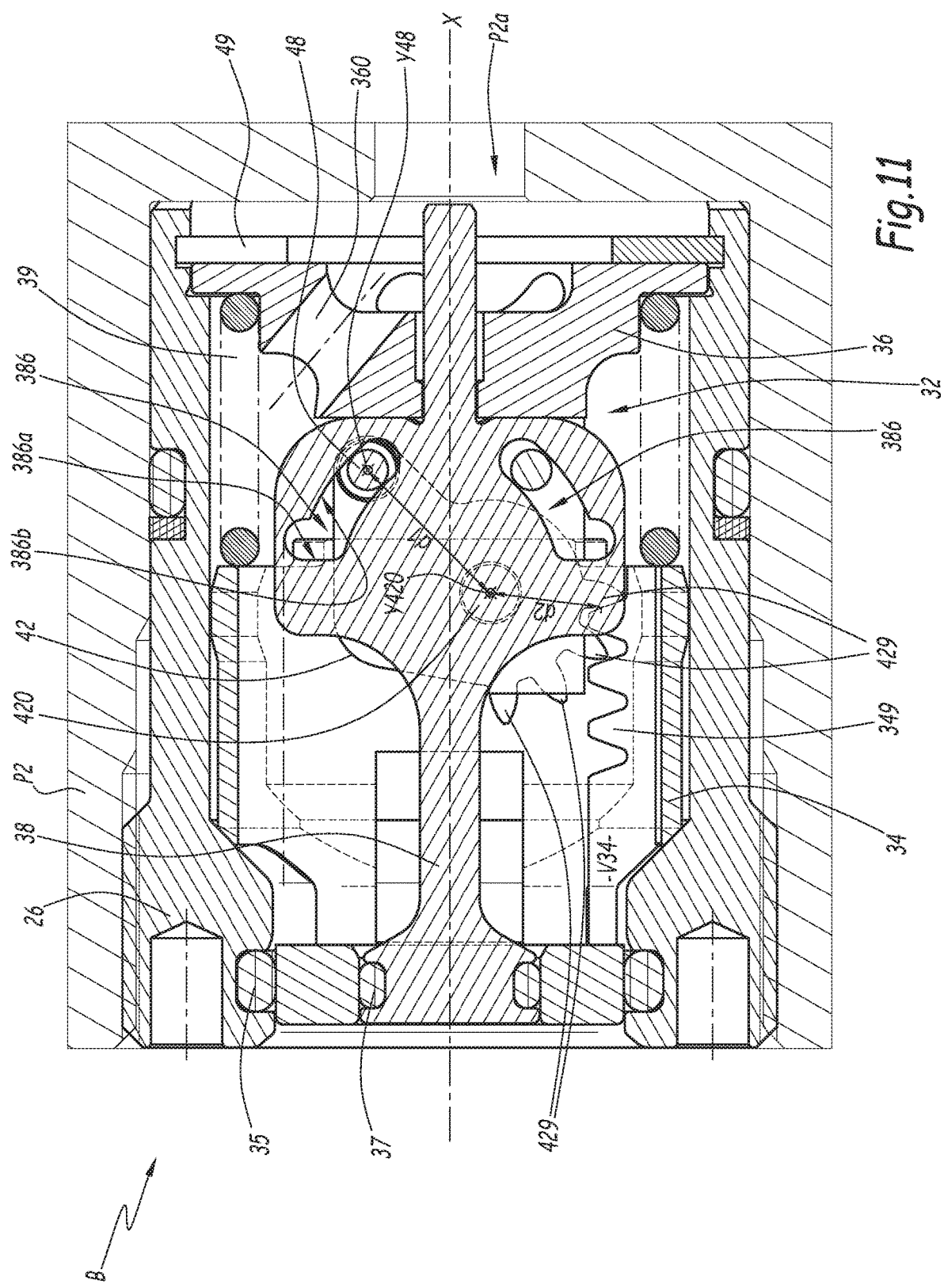
Figure 12:
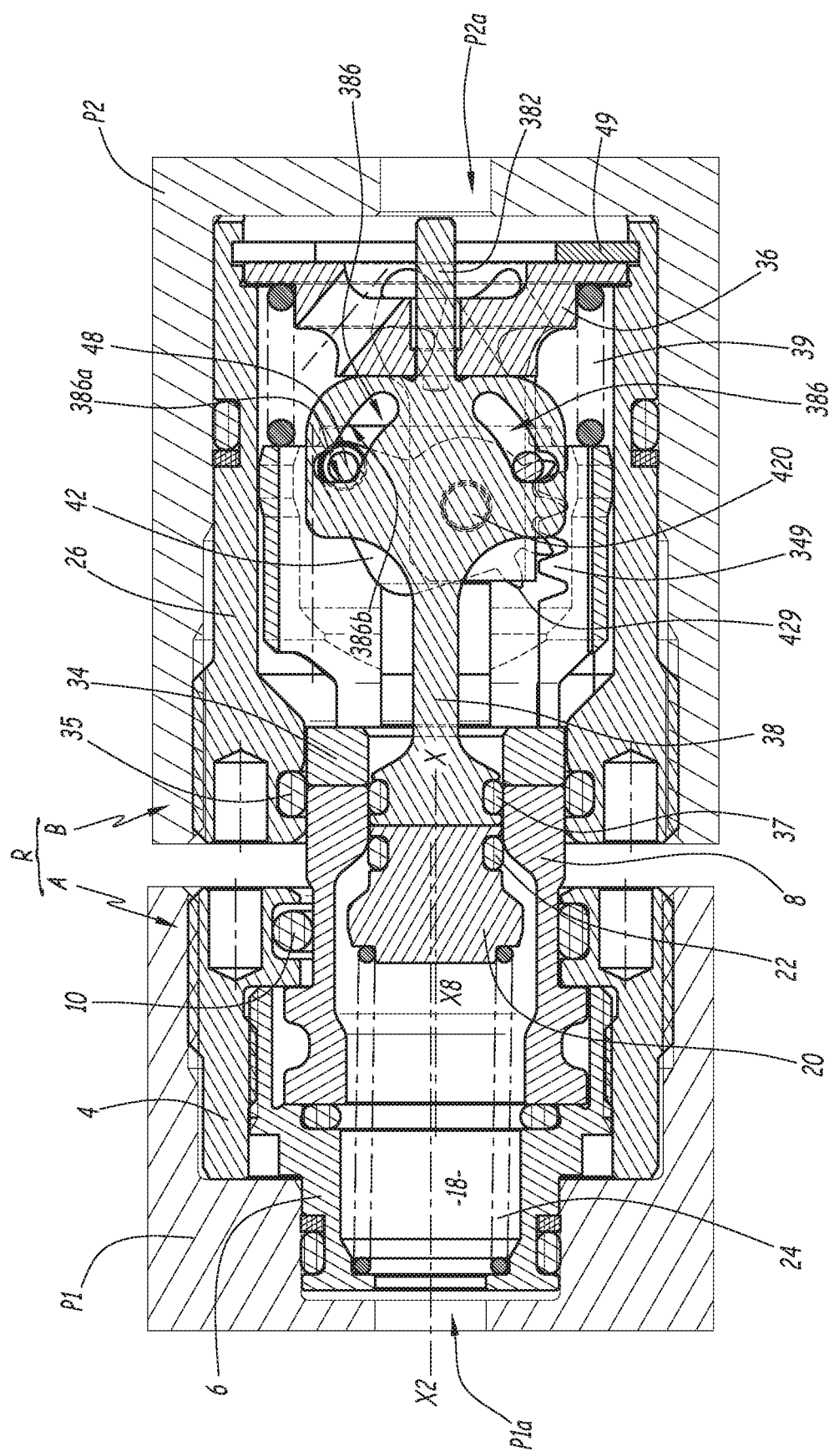
Figure 13:
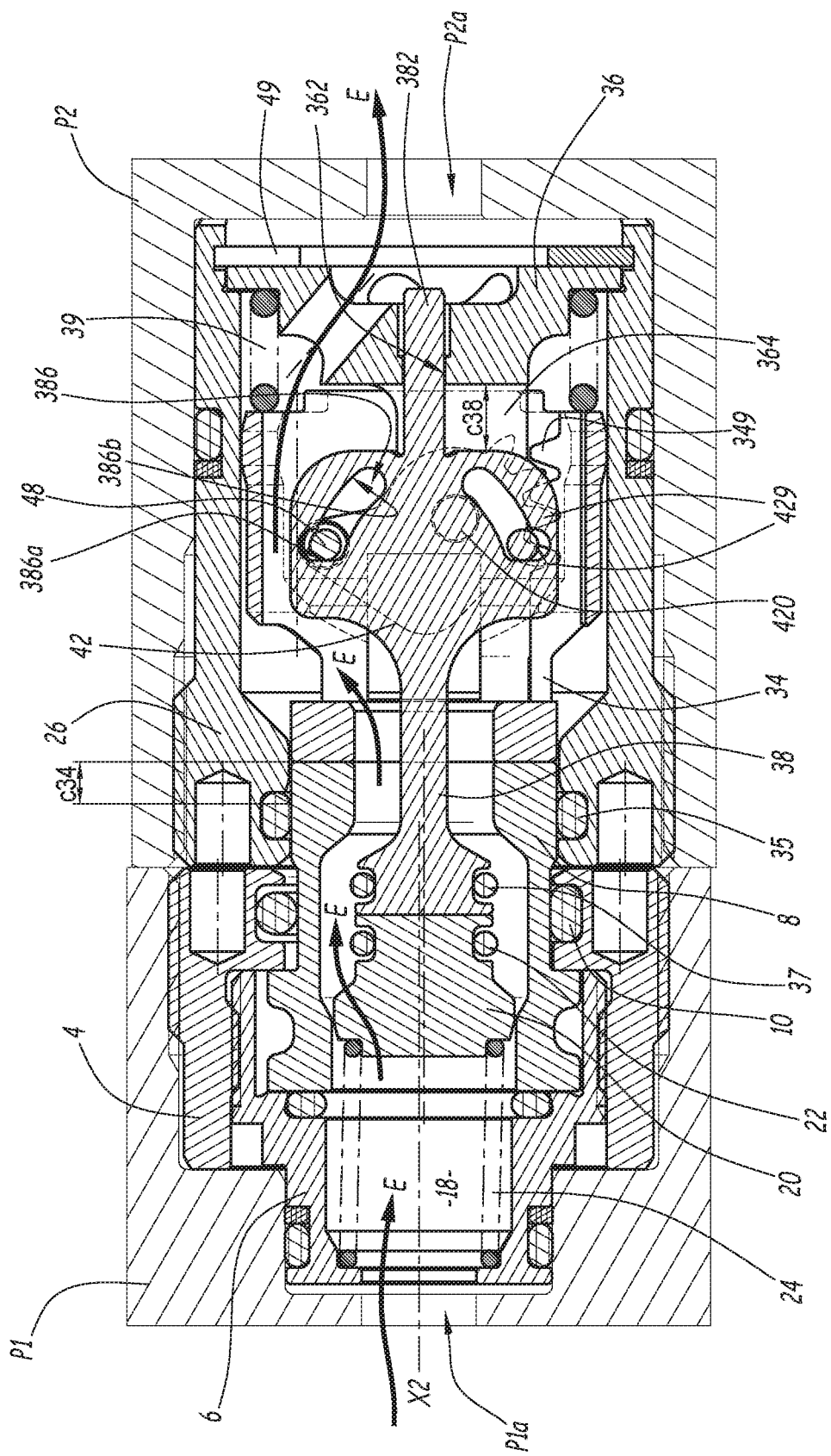

FIG. 3 a cross-section (enlarged) along plane III of the coupling of FIG. 1;

FIG. 4 is a longitudinal sectional view of the coupling of FIG. 1 in a first coupling step;

FIG. 5 is a longitudinal sectional view of the coupling of FIG. 1 in a second coupling step;

FIG. 6 a cross-section (enlarged) along plane VI of the coupling of FIG. 5;

FIG. 7 is a longitudinal sectional view of the coupling of FIG. 1 in a coupled configuration;

FIG. 8 is a longitudinal sectional view of a female element belonging to a coupling according to a second embodiment of the invention;

FIG. 9 is a longitudinal sectional view of the coupling comprising the female element of FIG. 8, during coupling;

FIG. 10 is a sectional view of the coupling of FIG. 9 in the coupled configuration;

FIG. 11 is a longitudinal sectional view of a female element belonging to a coupling according to a third embodiment of the invention;

FIG. 12 is a longitudinal sectional view of the coupling comprising the female element of FIG. 11, during coupling;

FIG. 13 is a sectional view of the coupling of FIG. 12 in the coupled configuration.

FIG. 1 shows a fluidic coupling R comprising a male coupling element A and a female coupling element B, in an uncoupled configuration in which the male element A and the female element B are separated from one another. The male element A and the female element B are able to fit in one another for the removable junction of two fluid pipes.

The male element A comprises a male body 2. The male body 2 is made up of a front part 4 and a rear part 6 screwed to one another. The male body 2 is centered on a central longitudinal axis X2.

Hereinafter, the terms "front" and "rear" are respectively used for the elements of the male element A situated on the side of the female element B and the side opposite the female element B. This distinction is also used in the same manner for the elements of the female element B in reference to their position with respect to the male element A.

The terms "axial", "longitudinal" and "radial" are used in reference to the axis X2.

The male body 2 also comprises a nose 8 that is mounted with the possibility of radial travel relative to the front part 4 and the rear part 6 of the male body 2, i.e., in a direction perpendicular to the axis X2. The nose 8 is centered on a longitudinal axis X8. As an example, this travel can be about 0.25 mm. The nose 8 is sandwiched between the front part 4 and the rear part 6. The front part 4 and the rear part 6 form a housing for a widened part 80 of the nose 8 and lock the nose 8 in an axial translation. The nose 8 comprises a central portion 82, mounted in a narrower region 40 of the front part 4. This central portion 82 has an outer diameter smaller than the inner diameter of the narrower region 40 and the wider portion 80 has an outer diameter smaller than the inner diameter of its housing between the front portion 4 and the rear portion 6, which allows the radial travel of the nose 8.

An O-ring 10 is inserted between the nose 8 and the front portion 4 and returns the nose 8 to a central position, i.e., an aligned position of the axis X8 with the axis X2, when the male element A is uncoupled. The O-ring 10 is housed in a groove 40a of the narrower portion 40.

A first sealing gasket 12 is inserted axially between the nose 8 and the rear portion 6.

The front portion 4 equipped with the rear portion 6 is screwed abutting in a first plate P1 with a second sealing gasket 14 and an anti-extrusion ring 16 inserted radially between the plate P1 and the rear portion 6.

The male body 2 defines an inner flow conduit 18 that extends along the axis X2, passes all the way through the male body 2 and communicates with a flow pipe P1a of the plate P1. A valve 20 is mounted movably in the inner conduit 18, inside the nose 8. The valve 20 is movable along the axis X8 between a closed position of the inner conduit 18, shown in FIG. 1, and an open position of the inner conduit 18, shown in FIG. 7. The male element A includes a third sealing gasket 22 housed in an outer groove 200 of the valve 20, and in the uncoupled configuration, this gasket 22 cooperates radially with a narrower front region 84 of the nose 8, which protrudes from a front face P1b of the plate P1.

The male element A also includes a spring 24 that pushes the valve 20 back toward its closed position. In the closed position, a front face 202 of the valve 20 is axially aligned with a front face 84a of the nose 8. This front face 84a is carried by the narrower front region 84. In the closed position of the valve 20, the front face 202 and the front face 84a are comprised in a same plane perpendicular to the longitudinal axis X2.

The female coupling element B comprises a female body 26 [and] is screwed into a second plate P2. The female body 26 defines a longitudinal central axis X. For the elements of the female element B, the terms "axial", "longitudinal" and "radial" refer to the axis X.

The female coupling element B comprises a first sealing gasket 28 and an anti-extrusion ring 30 providing radial sealing between the female body 26 and the second plate P2.

The female body 26 defines an inner conduit 32 that extends along the axis X, passes all the way through the female body 26 and communicates with a pipe P2a of the plate P2.

The female element B includes a slide valve, formed by a slide valve ring 34, a yoke ring 36 and a piston 38 that are mounted within the inner conduit 32.

The slide valve ring 34 is movable along the axis X between a closed position, shown in FIG. 1, and an open retracted position, shown in FIG. 7. In the closed position, the slide valve ring 34 is abutting against the female body 26 and cooperates radially sealably with a solid cylindrical head 380 of the piston 38 and the female body 26. The female element B includes a second sealing gasket 35 housed in an inner groove 260 of the female body 26, said gasket 35 providing the sealed cooperation between the female body 26 and the slide valve 34. The female element B includes a third sealing gasket 37 housed in an outer groove 380a of the piston head 380, which provides the sealed cooperation between the slide valve 34 and the piston head 380. In the closed position, a front face 340 of the slide valve 34 is axially aligned with a front face 380b of the piston 38, carried by the piston head 380. In the uncoupled configuration, the front edge of the outer groove 380a is axially aligned with the front edge of the inner groove 260, which allows the piston head 380 to be axially compact. In an alternative that is not shown, the front edge of the outer groove 380a is axially behind the front edge of the inner groove 260.

The female element B includes a spring 39 that pushes the slide valve ring 34 back toward its closed position. The slide valve ring 34 can be pushed back into the inner conduit 32 in the open position of the inner conduit 32, against the force of the spring 39.

The yoke ring 36 is mounted behind the female body 26. The yoke ring 36 is mounted with reduced radial play in a cylindrical housing 264 of the female body 26. The yoke ring 36 is therefore radially secured to the female body 26. The yoke ring 36 provides a rear stop for the piston 38, by a front surface 366 that opposes a rear surface 381 of the piston 38, when the latter is in a rear position shown in FIG. 1, and a bearing for the spring 39.

The yoke ring 36 is pierced with passages 360 for the circulation of fluid in the inner conduit 32. In this example, there are five passages 360, which are inclined relative to the axis X.

The piston 38 extends along the longitudinal central axis X and has a rear centering rod 382, with a cylindrical section with two flats 382a, which is engaged in a cylindrical through guide housing 362 of the yoke ring 36, the surfaces of which cooperating with the cylindrical portions of the rear rod 382 guide the piston 38 in a translational movement in the female body 26 along the longitudinal axis X.

The piston 38 includes a wider and flat portion 384 extending axially between the piston head 380 and the centering rod 382. The yoke ring 36 has a pair of flanges 364 that extend forward, parallel to the longitudinal axis X and between which the wider and flat portion 384 is positioned. The wider and flat portion 384 and the flanges 364 extend in parallel planes. The slide valve ring 34 partially surrounds the flanges 364 of the yoke ring 36 as well as the piston 38 and forms two planar inner surfaces 342 that extend parallel to the flanges 364 and the wider and flat portion 384.

The female element B comprises a device for converting the axial movement of the slide valve ring 34 into an axial movement of the piston 38 in the opposite direction, inserted between the slide valve ring 34 and the piston 38. This movement conversion device is detachable, as will emerge from the remainder of the description. Thus, the piston 38 is mounted with the possibility of movement relative to the female body 26 along the longitudinal axis X only in certain coupling and uncoupling phases. This movement conversion device comprises two flattened levers 42, or switches, with a triangular outer shape, for example right-angled triangles with rounded apices.

Each lever 42 is positioned between each planar inner surface 342 of the slide valve ring 34 and each flange 364. Each lever 42 is articulated relative to the female body 26 around a rotation axis Y420 formed by a fixed axle 420 that protrudes from the lever 42 along a direction Y orthogonal to the longitudinal axis X and orthogonal to the flanges 364, and which is mounted pivoting in a housing 364a formed on the adjacent flange 364.

The movement conversion device also comprises two cylindrical slide valve axles 44 with central axis Y44, each slide valve axle 44 being attached by screwing in a threaded hole 421 of the lever 42 and bearing a generally rectangular skid 46 that is housed in one of the two cavities 344 passing through the slide valve ring 34. The cavities 344 are arranged through a wall 346 of the slide valve ring 34 parallel to the planar inner surfaces 342. Each central axis Y44 forms a hinge pin between the corresponding lever 42 and the slide valve ring 34. The skids 46 each include a guide bearing 460 inserted between each slide valve axle 44 and its skid 46 so as to provide the guiding and the rotational freedom of the skid 46 relative to the slide valve axle 44. Each slide valve axle 44 cooperates with the cavity 344 in which it is engaged via its skid 46.

Each cavity 344 of the slide valve ring 34 is generally rectangular, and its largest dimension extends in a direction Z transverse to the longitudinal axis X and also orthogonal to the direction Y. The width of the cavities 344, i.e., the dimension along the longitudinal axis X, is substantially equal to the width, along the same axis, of the skids 46. The height, in the direction Z of the cavities 344, is greater than the height, in the same direction Z, of the skids 46. This allows sliding of the skids 46 in the cavities 344 in the direction Z.

The movement conversion device also comprises two cylindrical pins 48, with central axis Y48, each pin 48 being secured to a lever 42 and extending parallel to the central axis Y44 and to the rotation axis Y420, the pin 48 protruding from the lever 42 from a same lateral face 422 of the lever 42 as the fixed axle 420, and the slide valve axle 44 protruding from the lever 42 from a lateral face 424 opposite the lever 42.

The wider and flat portion 384 of the piston 38 has two holes 386, the shape of which is substantially triangular. Each pin 48 is engaged in one of the two holes 386. Each triangular hole 386 has an active planar surface 386a facing the rear of the female body 26 and perpendicular to the longitudinal axis X, a curved surface 386b, the curve radius of which is centered on the fixed axle 420, and a surface 386c inclined relative to the longitudinal axis X, for example by an angle a of about 10°.

"Active surface" refers to any interaction surface between the lever 42 and the piston 38 or between the lever 42 and the slide valve 34 by which there is a transmission of movement from the lever 42 to the piston 38, respectively from the slide valve 34 to the lever 42.

The central axis Y48 of the pin 48, the rotation axis Y420 of the fixed axle 420 and the central axis Y44 of the slide valve axle 44 associated with a same lever 42 extend in a same plane in all of the positions of the lever 42. The rotation axis Y420 is positioned between the central axes Y48 and Y44.

For each lever 42, the distance dl between the rotation axis Y420 of the fixed axle 420 and the central axis Y48 of the pin 48 is greater than the distance d2 between the rotation axis Y420 of the fixed axle 420 and the central axis Y44 of the slide valve axle 44. In particular, the ratio between the distance d1 and the distance d2 is at least equal to 1.2, preferably greater than or equal to 2, for example equal to 2.25.

The movement conversion device preferably comprises two levers 42 positioned on either side of the longitudinal axis X, two pins 48 that cooperate with two holes 386 of the piston 38, and two slide valve axles 44 that cooperate with two cavities 344 of the slide valve ring 34. The conversion device is thus positioned around the piston 38 and "symmetrical" relative to the longitudinal central axis X.

The slide valve ring 324 defines an inner volume V34 delimited by the inner surfaces 342 and in which the levers 42 and the piston 38 are mounted.

The mounting of the female element B is done as follows. A preassembly is mounted beforehand outside the female body 26. The piston 38 is placed between the two flanges 364, abutting on the rear against the yoke ring 36, with the centering rod 382 engaged in the guide housing 362. The two levers 42 are assembled, with the pins 48 and the fixed axles 420 engaged laterally respectively in the holes 386 of the piston 38 and in the housing 364a of the flanges 364. The spring 39 is then placed bearing on the yoke ring 36 and the slide valve ring 34 around the levers 42. The two skids 46 provided with their bearing 460 are then placed in the cavities 344 of the slide valve ring 34, and they are fastened to the respective lever 42 by screwing the slide valve axles 44 in the levers 42. The preassembly thus formed is inserted into the female body 26 through the rear, then a stop ring 49 is mounted in the female body 26 to keep the preassembly in the female body 26. This stop ring 49 can be formed by a resilient ring mounted in an inner slot 262 of the female body 26 that keeps the yoke ring 36 secured to the female body 26 along the longitudinal axis X. The female body 26 is next screwed into the plate P2 after having previously inserted the sealing gasket 28 and the anti-extrusion ring 30.

During coupling, the central axes X2 and X of the male 2 and female 26 bodies are aligned, with a maximum acceptable flaw D of 0.25 mm, and the two plates P1 and P2 are brought closer together. The nose 8 engages in the female body 26, aligning itself if needed with the position of the female body 26 due to its possibility of radial travel in the male body 2 while offsetting itself in the O-ring 10, then the nose 8 abuts against the slide valve ring 34. It will be noted in FIG. 4 that the nose 8 is out of alignment relative to the front portion 4, and that the O-ring 10 is more compressed in its lower portion than in its upper portion relative to the longitudinal axis X2. From there, the axes X8 and X are combined to form the coupling axis X.

Then, the piston head 380 abuts against the front face 202 of the valve 20 and simultaneously the front face 340 of the slide valve 34 comes into contact with the front face 84a of the nose 8. The continuation of the approach movement causes the movement by the piston 38 of the valve 20 toward its open position and the movement by the nose 8 of the slide valve ring 34 toward its open position. In FIG. 4, the nose 8 has come into contact with the second sealing gasket 35 and cooperates with the latter. In this configuration, the third sealing gasket 37 still cooperates with the slide valve ring 34, and the passage of fluid between the two coupling elements as well as between the slide valve 34 and the male body 8 is prevented.

During the movement of the slide valve ring 34 until this contact of the nose 8 on the second gasket 35, the slide valve ring 34 has withdrawn into the female body 26 along the longitudinal axis X, driving the slide valve axles 44 backward in its movement. The slide valve axles 44 are moved into the cavities 344, with the skids 46 that slide parallel to the transverse direction Z in contact with the active surfaces 344a of the cavities 344, surfaces oriented toward the rear of the female element B. The lever 42 visible in FIG. 1 is therefore rotated around its rotation axis Y420 in the counterclockwise direction according to arrow F1 in FIG. 4. The other lever 42 (not visible in FIGS. 1, 4, 5 and 7) is rotated around its rotation axis Y420 in the clockwise direction. The pin 48 borne by each lever 42 therefore describes a curve with a radius corresponding to the distance d1 around the fixed axle 420, along the curved surface 386b of the hole 386 of the piston. Since the pin 48 is positioned, relative to the slide valve axle 44, on the other side of the plane P420 passing through the rotation axis Y420, parallel to the axis X and perpendicular the plane of FIG. 4, this movement is oriented toward the front of the female coupling element B. The curved surface 386b having a curve radius centered on the fixed axle 420, this movement of the pin 48 therefore has no action on the piston 38, which remains in the rear position. The surface 386b ensures that during this phase, the piston 38 is kept in the rear position against the yoke ring 36.

In FIG. 5, when the plates P1 and P2 are closer together, the nose 8 has arrived past the mid-length of the groove 260, the mid-length being considered along the axis X, and the second gasket 35 radially surrounds the outer radial surface of the nose 8, which ensures radial sealing between the female body 26 and the male body 2. In this intermediate configuration, the third sealing gasket 37 still cooperates with the nose 8, the passage of fluid between the two coupling elements still being prevented.

The pin 48 has continued its curved movement under the action of the withdrawal of the slide valve ring 34 and has come into contact with the active planar surface 386a of the hole 386 (FIG. 5). In this configuration, the central axis Y48 of the pin 48, the rotation axis Y420 of the fixed axle 420 and the central axis Y44 of the slide valve axle 44 extend in a same plane, corresponding to the section plane VI, perpendicular to the coupling axis X. The slide valve ring 34 is in an offset position relative to its closing position, in which offset position the male body 2 cooperates with the second gasket 35 such that the sealing between the male body 2 and the female body 26 is provided by the second gasket, as explained above.

The coupling phase that extends from FIG. 1 to FIG. 5 allows a detachment of the connection between the levers 42 and the piston 38, therefore a free travel c0 of the slide valve ring 34. Indeed, during this phase, the lever 42 is engaged with the slide valve 34 but detached from the piston 38 and the axial movement of the slide valve ring 34 causes the rotation of the lever 42, but does not cause axial movement of the piston 38, which remains in the rear position. The conversion of the movement between the piston 38 and the slide valve ring is therefore detached from the uncoupled configuration (FIG. 1) to the intermediate configuration (FIG. 5), in which the sealing between the male body 2 and the female body 26 is effective, without the circulation of fluid being activated.

When the pin 48 cooperates with the curved surface 386b and does not cooperate with an active surface of type 386a, a movement of the lever 42 does not cause movement of the piston 38 in the female body 26: the lever 42 is detached from the piston 38.

From this contact between the pins 48 and the active surfaces 386a, the movement toward the rear of the slide valve ring 34 still drives the slide valve axles 44 backward and rotates the levers 42 around the fixed axles 420, pushing the pins 48 back toward the front of the female body 26. The pins 48 bearing on the active surfaces 386 push the piston 38 back toward the front, along arrow F2 in FIG. 5. From the intermediate configuration (FIG. 5) to the coupled configuration (FIG. 7), the levers 42 are therefore engaged both with the piston 38 and with the slide valve 34, which connects the movements of the slide valve ring 34 and the piston 38 along the longitudinal axis X.

In this phase, each lever 42 is engaged with the piston 38 inasmuch as the movement of the lever 42 causes the forward movement of the piston 38.

Each central axis Y48 forms a hinge pin between the lever 42 and the piston 38 when the piston 38 is engaged with the levers 42.

Due to the difference between the distances d1 and d2, the withdrawal movement of the slide valve ring 34 is scaled down, the forward movement of the piston 38 being greater than the withdrawal of the slide valve ring 34. During the movement of the piston 38 in the female body 26 toward its forward position, the piston 38 remains guided along the longitudinal axis X by cooperation of the centering rod 382 with the yoke ring 36 and by cooperation with the valve 20.

The approach between the plates P1 and P2 continues until the abutment and maintained abutment of the two plates P1 and P2 along the coupling axis X, or when an abutment, not shown, keeps the two plates P1 and P2 at a distance d3 (FIG. 7).

In FIG. 7, the slide valve ring 34 is in the open position and the coupled configuration of the coupling R is reached. The piston 38 has arrived in its forward position and has traveled, from its rear position, a journey c38 greater than a journey c34 traveled by the slide valve ring 34 in the same phase, which allows it to separate the valve 20 and to separate itself from the front region 84 of the nose 8 enough to allow a passage for the fluid between the piston 38 and the nose 8. In the forward position of the piston 38, the sealing gasket 37 is no longer in contact with the nose 8. A flow E therefore occurs in the inner conduit 18 of the male element A, the fluid flowing around the valve 20 by passages, not shown, around the piston 38, inside the slide valve ring 34, and in the inclined passages 360 of the yoke ring 36, between the two pipes P1a and P2a borne by the plates P1 and P2.

There is no stop for the piston 38 toward the front in the forward position, the forward position of the piston 38 being given by the open position of the slide valve 34 and the conversion kinematics of the movement of the slide valve 34 into movement of the piston 38 by the levers 42.

Between the intermediate configuration (FIG. 5) and the coupled configuration (FIG. 6), the piston 38 has traveled a journey 2.25 times greater than the journey traveled by the slide valve ring 34 in the opposite direction along the longitudinal axis X, in particular equal to the ratio between the distances d1 and d2.

The uncoupling is done according to a reversed sequence, the separation of the plates P1 and P2 causing the forward movement of the slide valve ring 34 in the female body 26 under the effect of the spring 39, and therefore the forward movement of the slide valve axles 44, and the pivoting of the lever 42 visible in FIG. 7 in the clockwise direction (the other lever 42, not visible, pivoting in the counterclockwise direction), since the levers 42 are engaged with the slide valve ring 34. Each skid 46 comes into contact with an active surface 344b of the corresponding cavity 344, the active surface 344b being oriented toward the front of the female element B. The valve 20 pushed back by the spring 24, toward its closed position, participates in the withdrawal movement of the piston 38, which continuously keeps the active surfaces 386a in contact with the pins 48, which withdraw. The slide valve ring 34 and the piston 38 are therefore still engaged with the levers 42, and the movement of the levers 42 causes the withdrawal of the piston 38. The withdrawal of the piston 38 takes place with the same travel scaling down as during the coupling up to the rear position of the piston 38 abutting against the yoke ring 36, in which the female body 26 and the male body cooperate sealably via the second gasket 35. Then, the slide valve ring 34 continues its movement toward its closed position under the effect of the spring 39. The levers 42 are now detached from the piston 38, while remaining engaged with the slide valve 34, with each pin 48 following the curved surface 386b of the hole 386 in which it moves. Each lever 42 being engaged with the slide valve ring 34, the movement of the slide valve ring 34 causes the movement of the levers 42. Each lever 42 being detached from the piston 38, the movement of the levers 42 does not cause a withdrawal movement of the piston 38 and the piston 38 therefore remains in the rear position. The slide valve ring 34 takes over the sealing with the female body 26 via the second gasket 35 and with the piston 38 via the third gasket 37. The valve 20 takes over the sealing with the male body 2 at the third gasket 22. Lastly, the slide valve ring 34 arrives in the closed position and the valve 20 arrives in the closed position.

The axial mobility of the piston 38 relative to the female body 26 makes it possible to impart a sufficient travel to the movement of the piston 38, even in case of small coupling travels, and therefore small travels of the slide valve ring 34, for a sufficient fluid passage.

The approach of the two coupling elements automatically causes the movement of the slide valve ring 34 by cooperation with the nose 8, due to the movement of the piston 38 when the levers 42 are engaged both with the slide valve ring 34 and with the piston 38.

The coupling sequence makes it possible for the piston 38 to be set in motion only from an offset position of the slide valve ring 34 from which the movement conversion device will provide the sealing between the male body 2 and the female body 26 before the loss of sealing between the slide valve 34 and the piston 38. This is allowed by the free travel c0 of the slide valve ring 34 without movement of the piston 38 when the levers 42 are detached from the piston 38, to allow the sealing during the connection, then driving of the piston 38 forward by the withdrawal of the slide valve ring 34 past the free travel.

The movement conversion device, comprising the levers 42 and the cooperations between the pins 48 and the holes 386, is compact. In particular, the configuration in which the central axes Y48, Y420 and Y44 of the pin 48, the fixed axle 420 and the slide valve axle 44 associated with a lever 42 are coplanar is particularly non-cumbersome in the longitudinal direction.

The cooperation between the slide valve ring 34 and the levers 42 by the slide valve axles 44 and the cavities 344, which do not include a longitudinal portion (the skids 46 being movable in the cavities 344 only perpendicular to the longitudinal axis X), limits the risks of jams during the movement of the slide valve axles 44 toward the rear.

The arrangement of the piston 38 between the flanges 364 and the yoke ring 36, which is stationary relative to the female body 26, limits the friction and the deformation of the piston 38 during the pivoting of the levers 42.

The triangular outer shape of each lever 42 limits the possibilities for rotation of the slide valve ring 34 around the longitudinal axis X relative to the female body 26 and the piston 38 in the uncoupled configuration and during coupling or uncoupling. Indeed, this triangular shape provides the levers 42 of the lateral faces 422 and 424 with a larger surface area than if the levers 42 were simple elongate elements. These faces 422 and 424 allow an extended surface cooperation with the inner faces 342, which limits the potential rotations of the slide valve ring 34.

The triangular holes 386 (and not V-shaped along the passage of the pin 48 in the hole 386) limits jams in the return movement of the piston 38 toward its rear position.

The guiding of the longitudinal movement of the piston 38 by its bearing with the valve 20 and its engagement in the yoke ring 36 (by the housing 362) over all of its axial movement travel prevents jams of the piston 38.

In the uncoupled configuration, the sealing gaskets 22, 35 and 37 are protected, i.e., concealed relative to the outside environment of the male and female elements of the coupling R, which reduces the risks of alteration of these gaskets by a polluted environment.

Upon uncoupling, the springs 39 and 24, which respectively push the slide valve ring 34 and the valve 20 back toward their closed positions, also provide the return of the levers 42 and the piston 38 toward the positions that they occupy in the uncoupled configuration. No additional spring or resilient element is necessary between the levers 42 and the female body 26 to obtain the movement of the levers 42 allowing the return of the piston 38 toward its rear position.

Second and third embodiments of the invention are respectively shown in FIGS. 8 to 13. In these embodiments, the elements shared with the first embodiment bear the same references and operate in the same manner. Only the differences with respect to the embodiment of FIGS. 1 to 7 are outlined below.

In the embodiment of FIGS. 8 to 10, the structure of the cooperations between the slide valve axles and the slide valve ring 34, and between the piston 38 and the pins, is reversed. The piston 38 bears a pin 388 (playing the role of the pin 48) engaged in a hole 426 of the lever 42, and the slide valve ring 34 bears a slide valve axle 348 (playing the role of the slide valve axle 44) engaged in a cavity 428 of the lever 42. The cavity 428 has a sliding portion 428a that extends longitudinally in the uncoupled configuration, and an active surface 428b that extends in an inclined manner relative to the sliding portion 428a. In particular, in the uncoupled configuration, the active surface 428b extends orthogonally to the longitudinal axis X.

In the uncoupled configuration, the piston 38 is in the rear position and the central axis Y388 of the pin 388, the rotation axis Y420 of the fixed axle 420, the central axis Y348 of the slide valve axle 348 associated with a same lever 42 are parallel and extend in a same plane.

During the coupling, each slide valve axle 348 withdraws along the axis X in a manner secured with the slide valve ring 34 without action on the associated lever 42, since each slide valve axle 348 moves slidingly in the sliding portion 428a of the cavity 428, which extends longitudinally and therefore parallel to the movement direction of the slide valve ring 34. There is therefore no pivoting of each of the levers 42 throughout the entire coupling phase in which each slide valve axle 348 moves in the sliding portion 428a, from the uncoupled configuration (FIG. 8) to the intermediate configuration (FIG. 9). The levers 42 are therefore detached from the slide valve ring 34 in this phase and the movement of the slide valve 34 does not cause movement of the levers 42, and therefore movement of the piston 38.

In FIG. 9, when or after the male body 2 cooperates with the sealing gasket 35 such that the sealing between the male body 2 and the female body 26 is done using the sealing gasket 35, in an offset position of the slide valve ring 34 relative to its closed position, each slide valve axle 348 is abutting against the active surface 428b of the cavity 428, and the withdrawal of the slide valve ring 34 causes the pivoting of the levers 42. From that moment, the levers 42 are engaged with the slide valve ring 34 while remaining engaged with the piston 38. The movement of the slide valve 34 causes the movement of each of the levers 42 and the movement of each of the levers 42 causes the movement of the piston 38.

The slide valve axle 348 moves against the active surface 428b and rotates the lever 42 around the rotation axis Y420 (in the counterclockwise direction in FIG. 9 for the lever 42 visible in FIGS. 8 to 10). The active surface 428b becomes gradually inclined relative to the longitudinal axis X due to the pivoting of the lever 42.

At the same time, the hole 426, which is initially perpendicular to the longitudinal axis X in FIGS. 8 and 9, becomes gradually inclined, causing a forward movement of the pin 388 engaged in said hole 426, by contact of the pin 388 with an active surface 426 of said hole 426. The forward movement of the piston 38 relative to the female body 26 to its forward position is then obtained.

Upon uncoupling, the withdrawal movement of the slide valve 34 causes the movement of the slide valve axle 348 toward the sliding portion 428a, in contact with an active surface 428c of the cavity 428 facing the active surface 428b. The lever 42 of FIG. 10 is rotated around the axis Y420. The pin 388 in contact with an active surface of the hole 426 is driven backward, which drives the piston 38 toward its rear position.

In an alternative that is not shown, the levers 42 may bear only one cavity delimiting the active surface 428b for the slide valve axle 348, instead of a cavity 428 bounded in the front by a portion 431 curved toward the rear. The female element B would then include a resilient return means for each lever 42 that would return the lever 42 toward its initial position corresponding to the uncoupled configuration and would keep it in this position during the movement of the slide valve axle 348 in the sliding portion 428a upon uncoupling. This return means would be formed by an additional spring inserted between the female body and the lever 42.

In the embodiment of FIGS. 11 to 13, the mode for converting the movement between the slide valve ring 34 and the levers 42 is different from that of FIGS. 1 to 7. The slide valve ring 34 is equipped with a rack 349 that cooperates with teeth 429 formed around the fixed axle 420 and on the lever 42. The teeth 429 are placed along an arc of circle centered on the rotation axis Y420 and extend radially relative to the rotation axis Y420. When the slide valve ring 34 withdraws, the cooperation between the rack 349 and the teeth 429 causes the rotation of the lever 42 around the rotation axis Y420 (in the counterclockwise direction of FIG. 11 for the lever 42 visible in FIGS. 11 to 13). The slide valve ring 34 and the levers 42 are engaged and the movement of the slide valve 34 causes the movement of the levers 42.

In this embodiment, the distance d2 is measured between the stationary axle 420 and the contact points between the teeth 429 and the teeth of the rack 349.

In FIGS. 11 to 13, the holes 386 of the piston 38 have a curved shape. Alternatively, the holes 386 can have a triangular shape similar to that of FIGS. 1 to 7. Each hole 386 cooperates with a pin 48 secured to the lever 42.

In the coupling phase, as long as the pin 48 follows the curved surface 386b of the hole 386, centered on the rotation axis Y420, the lever 42 is detached from the piston 38 and the piston 38 remains in the rear position. Once the pin 48 comes into contact with the active surface 386a, in the intermediate configuration of FIG. 12 (after or when the sealing between the male body 2 and the female body 26 is effective) in which the slide valve ring 34 is in an offset position relative to its closed position, the lever 42 is engaged with the piston 38 while remaining engaged with the slide valve ring 34 and the rotation of the lever 42 by the withdrawal of the slide valve ring 34 drives the movement of the piston 38 forward.

In all of the embodiments, the free travel c0 is non-nil, for example around 2 mm for a total travel of the slide valve 34 of around 4 mm, and the offset position of the slide valve 34 from which the lever 42 is engaged both with the slide valve 34 and the piston 38 is different from the closed position of the slide valve 34.

In an alternative that is not shown, the rack may equip the piston 38 while the connection between the slide valve ring 34 and the lever 42 is provided by a pin/hole cooperation similar to that of FIGS. 8 to 10.

According to other variants that are not shown:

The female element B may comprise only one lever 42 providing the conversion of the withdrawal movement of the slide valve ring 34 into a forward movement of the piston 38.

The forward movement of the piston 38 may be initiated before the radial cooperation of the gasket 35 with the male element 2, in particular when, in the uncoupled configuration, the front edge of the outer groove 380*a* is not axially aligned, but behind relative to the front edge of the inner groove 260. It is then possible to engage the lever(s) 42 with the slide valve 34 and with the piston 38 from an offset position of the slide valve 34, for which the gasket 35 does not yet cooperate with the nose 8 and the male body/female body sealing is not yet effective, but which guarantees that, despite its forward movement caused by the withdrawal movement of the slide valve 34, the piston 38 will leave its sealed contact with the slide valve 34 while the male body/female body sealing will have become effective.

The two holes 386 arranged on the piston 38 can communicate and form one same hole (no surfaces 386*c*).

The lever 42 can comprise the pin 48 and a hole for the slide valve axle 44, or the lever 42 can comprise the slide valve axle 44 and a hole in which the pin 48 moves.

By using a cavity of type 428 and a hole of type 386 with suitable geometries in a same coupling element, the lever 42 can be detached from the slide valve 34 and the piston 38 from the closed position to a first position of the slide valve 34, then only from the piston 38 from the first position to an offset position of the slide valve 34 for cooperation of the male body 2 with the second gasket 35.

The active surface 386*a* has been described as being rectilinear and extending in a plane perpendicular to the longitudinal axis X in the uncoupled configuration, but it can be inclined relative to the plane perpendicular to the longitudinal axis X in the uncoupled configuration or it can be curved for a gradual scaling down of the movement of the slide valve ring 34.

The third gasket 37 of the female element B can be housed in the slide valve ring 34.

The third gasket 22 of the male element A can be housed in the male body 2.

In the case where the female body 26 houses several sealing gaskets in parallel to provide the sealing between the male body 2 and the female body 26, it is the position of the slide valve ring 34 offset relative to the sealing gasket located closest to the mouth of the female body 26 that must be considered to allow the movement of the piston 38.

In place of the skid 46, it is possible to provide a roller around the slide valve axle 44. This roller cooperates by contact with the active surface 344*a*. Likewise, the pin 48 can cooperate with the hole 386 in which it moves via a roller mounted on the pin 48 able to come into contact with the active surface 386*a* of the hole 386.

The invention has been described with couplings for plates (this arrangement does not include locking members integrated into the coupling elements), but it can be implemented on coupling elements with locking members (for example balls, fingers, prongs, segments, etc.).

The invention claimed is:

1. A fluidic coupling comprising a male coupling element and a female coupling element able to fit in one another, the male element comprising:
    a male body defining an inner conduit,
    a valve, movable relative to the male body between an open position and a sealed closed position of the inner conduit of the male body,
    a spring pushing the valve back toward its closed position,
and the female coupling element comprising:
    a female body defining an inner conduit along a longitudinal central axis and including at least one sealing gasket,
    a piston extending along the longitudinal central axis,
    a slide valve mounted around the piston and movable relative to the female body along the longitudinal central axis between a closed position, in which the sealing gasket of the female body cooperates with the slide valve and the slide valve cooperates sealably with the piston, and a retracted open position of the inner conduit of the female body,
    in a coupling phase between the male element and the female element, the male body pushes the slide valve back toward its open position and the piston pushes the valve back toward its open position,
wherein:
    the piston is mounted with the possibility of movement relative to the female body along the longitudinal central axis between a rear position and a forward position,
    the female element comprises at least one lever for converting the movement of the slide valve into movement of the piston,
during the coupling phase:
    from the closed position of the slide valve to an offset position of the slide valve, in which the male body cooperates with the sealing gasket of the female body, the or each lever is disengaged from the slide valve and/or the piston, and the piston is in the rear position;
    from the offset position of the slide valve to the open position of the slide valve, the lever is engaged with the slide valve and with the piston, and moves the piston toward its forward position;
    in the coupled configuration, the piston is in its forward position and extends partially in the male body, a fluid passage being formed around the piston in the male body.

2. The fluidic coupling according to claim 1, wherein the lever is mounted rotatably around a fixed rotation axis relative to the female body.

3. The fluidic coupling according to claim 1, wherein the lever cooperates with the piston by a pin moving in a hole, and wherein the lever is engaged with the piston by cooperation of the pin with an active surface of the hole.

4. The fluidic coupling according to claim 3, wherein the lever is mounted rotatably around a fixed rotation axis relative to the female body, and wherein between the closed position and the offset position of the slide valve, the lever is detached from the piston and the pin is in motion in the hole along a curved surface of the hole, centered on the rotation axis of the lever.

5. The fluidic coupling according to claim 1, wherein the slide valve cooperates with the lever by a slide valve axle moving in a cavity, and wherein the lever is engaged with the slide valve by cooperation of the slide valve axle with an active surface of the cavity.

6. The fluidic coupling according to claim 1, wherein between the closed position and the offset position of the slide valve, the lever is detached from the slide valve, and wherein the slide valve cooperates with the lever by a slide valve axle moving in a cavity comprising a longitudinal sliding portion in which the slide valve axle moves when the lever is detached from the slide valve, and an active surface inclined relative to the sliding portion, with which the slide valve axle cooperates when the lever is engaged with the slide valve.

7. The fluidic coupling according to claim 1, wherein the ratio between an axial movement travel of the piston between its rear position and its forward position and an axial movement travel of the slide valve between its offset position and its open position in the coupled configuration is at least equal to 1.2, preferably at least equal to 2.25.

8. The fluidic coupling according to claim 1, wherein the piston extends along the longitudinal central axis, and wherein the female element comprises two levers positioned on either side of the longitudinal central axis, each of the levers cooperating with the piston by a pin moving in a hole of the piston, each of the levers cooperating with the slide valve by a slide valve axle moving in a cavity of the slide valve, and each of the levers comprising a fixed axle pivoting in a housing secured to the female body along the longitudinal central axis.

9. The fluidic coupling according to claim 8, wherein for each lever, in a configuration engaged with the piston and with the slide valve, the ratio between the distance between the fixed rotation axis and a central axis of the pin and the distance between the fixed rotation axis and a central axis of the slide valve axle is strictly greater than 1.2, preferably greater than or equal to 2.

10. The fluidic coupling according to claim 1, wherein the slide valve is formed by a ring delimiting an inner volume in which the lever(s) and the piston are mounted.

11. The fluidic coupling according to claim 1, wherein the piston comprises a rear centering rod, and wherein in all the positions of the piston in its movement relative to the female body, the rear rod is engaged in a guide housing secured to the female body.

12. The fluidic coupling according to claim 1, wherein the fluidic coupling comprises a yoke ring mounted secured to the female body along the longitudinal central axis, and wherein the yoke ring comprises at least one flange that extends along the longitudinal central axis and that cooperates laterally with the piston and the lever.

13. The fluidic coupling according to claim 12, wherein the yoke ring forms a stop behind the piston in its rear position.

14. The fluidic coupling according to claim 1, wherein the or each lever has a triangular outer shape.

15. The fluidic coupling according to claim 1, wherein the male body comprises a nose mounted with the possibility of movement, transversely to the longitudinal central axis, relative to another portion of the male body.

* * * * *